United States Patent
Sieradzki et al.

(10) Patent No.: US 11,833,729 B2
(45) Date of Patent: Dec. 5, 2023

(54) REDUCED MATERIAL CONTAINER AND METHOD OF FORMING SAME

(71) Applicant: Discma AG, Hünenberg (CH)

(72) Inventors: Richard Sieradzki, Novi, MI (US); Corey Janes, Hillsdale, MI (US); Darrel Lee, Saline, MI (US); Mark Blystone, Saline, MI (US)

(73) Assignee: DISCMA AG, Hünenberg (CH)

( * ) Notice: Subject to any disclaimer, the term of this patent is extended or adjusted under 35 U.S.C. 154(b) by 69 days.

(21) Appl. No.: 17/596,706

(22) PCT Filed: Jun. 23, 2020

(86) PCT No.: PCT/IB2020/055932
§ 371 (c)(1),
(2) Date: Dec. 16, 2021

(87) PCT Pub. No.: WO2020/261122
PCT Pub. Date: Dec. 30, 2020

(65) Prior Publication Data
US 2022/0339846 A1    Oct. 27, 2022

Related U.S. Application Data

(60) Provisional application No. 62/868,171, filed on Jun. 28, 2019.

(51) Int. Cl.
*B29C 49/50* (2006.01)
*B29C 49/06* (2006.01)
(Continued)

(52) U.S. Cl.
CPC ............. *B29C 49/46* (2013.01); *B29C 49/06* (2013.01); *B29C 49/1212* (2022.05);
(Continued)

(58) Field of Classification Search
CPC ......... B29C 49/50; B29C 49/06; B29C 49/12; B29C 49/4252; B29C 2793/0081
See application file for complete search history.

(56) References Cited

U.S. PATENT DOCUMENTS 3,390,426 A * 7/1968 Turner ................... B29C 49/10
425/441
4,026,984 A   5/1977 Seefluth
(Continued)

*Primary Examiner* — Robert B Davis
(74) *Attorney, Agent, or Firm* — Michael E. Dockins; Shumaker, Loop & Kendrick LLP

(57) ABSTRACT

Systems and methods for making a reduced material container (105) are provided that hold a preform (130) adjacent to an open end (165) of the preform (130), stretch the preform (130), close a mold (110, 120) about the stretched preform (175) to form a truncated preform (185), and introduce a pressurized fluid (160) into the truncated preform (185) to expand the truncated preform (185) and form the reduced material container (105). A stretch rod (125) can be inserted into the preform (130) to mechanically stretching the preform (130). The mold (110, 120) accepts the preform (130) at a first end (135) thereof, has an open state and a closed state, and the closed state forms a cavity (140) defining an internal surface (145) having a second end (150) located remotely from the first end (135). A first length (155) is defined by a distance between the first end (135) and the second end (150), the stretch rod (125) mechanically stretching the preform (130) to a second length (170), the second length (170) being greater than the first length (155).

18 Claims, 8 Drawing Sheets

(51) Int. Cl.
*B29C 49/12* (2006.01)
*B29C 49/42* (2006.01)
*B29C 49/46* (2006.01)
*B29C 49/58* (2006.01)
*B29C 49/62* (2006.01)
*B29C 49/78* (2006.01)
*B29C 49/02* (2006.01)

(52) U.S. Cl.
CPC .... *B29C 49/4289* (2013.01); *B29C 49/42403* (2022.05); *B29C 49/50* (2013.01); *B29C 49/58* (2013.01); *B29C 49/62* (2013.01); *B29C 49/783* (2013.01); *B29C 2049/024* (2013.01); *B29C 2049/4635* (2013.01); *B29C 2049/4652* (2013.01); *B29C 2049/4664* (2013.01)

(56) References Cited

U.S. PATENT DOCUMENTS

| | | |
|---|---|---|
| 2011/0300249 A1 | 12/2011 | Andison et al. |
| 2012/0031870 A1 | 2/2012 | Porter et al. |
| 2017/0217077 A1* | 8/2017 | Suyama .............. B29C 49/4289 |

* cited by examiner

REDUCED MATERIAL CONTAINER AND METHOD OF FORMING SAME

CROSS-REFERENCE TO RELATED APPLICATIONS

This application claims the benefit of U.S. Provisional Application No. 62/868,171, filed on Jun. 28, 2019. The entire disclosure of the above application is incorporated herein by reference.

FIELD

The present technology relates to reducing an amount of material used in forming a container, including stretching and truncating a preform for injection blow molding into a container.

INTRODUCTION

This section provides background information related to the present disclosure which is not necessarily prior art.

Various products are distributed in plastic containers, such as containers formed from one or more polymers. Common polymers used to form containers include polyesters, such as polyethylene terephthalate (PET), high and low density polyethylenes, polycarbonate, and polypropylene, among others. Plastic containers can be made using various blow molding processes including injection blow molding and extrusion blow molding.

Injection blow molding can be used to form certain plastic containers in one or more stages and can involve use of a stretch rod. In a two-stage injection stretch blow molding process, the plastic is first molded into a preform using an injection molding process. The preform can include the neck and finish of the container to be formed, which can include threading thereon, and a closed distal end. The preform can then be heated above the plastic glass transition temperature, longitudinally stretched with a stretch rod, and blown using high-pressure gas (e.g., air) into a container conforming to a mold. As the preform is inflated, it elongates and stretches, taking on the shape of the mold cavity. The plastic solidifies upon contacting the cooler surface of the mold and the finished hollow container is subsequently ejected from the mold. The injection stretch blow molding process can be used to form plastic containers for packaging consumer beverages, as well as other liquids and materials. However, the process has some inherent limitations, which include undesirable gate wells or discontinuities on the bottom portions of containers as well as limitations on the possible spectrum of designs that can be realized using the stretch blow molding process, such as containers incorporating a handle or void space therein.

There is a need to optimize container uniformity and material investment in making, shipping, and recycling containers.

SUMMARY

The present technology includes systems, processes, and articles of manufacture that relate to a reduced material container, including a reduced material container formed by injection blow molding a stretched and truncated preform.

Systems for making a reduced material container are provided that include a mold, a blow nozzle, a holder, and a stretch rod. The mold is configured to accept a preform at a first end thereof. The mold has an open state and a closed state, where the closed state forms a cavity defining an internal surface and the internal surface has a second end located remotely from the first end. A first length is defined by a distance between the first end and the second end. The blow nozzle is configured to receive a pressurized fluid and dispense the pressurized fluid to the preform. The holder is configured to hold the preform adjacent to an open end of the preform. The stretch rod is configured to mechanically stretch the preform to a second length, where the second length is greater than the first length. The stretch rod is operable to stretch the preform to the second length when the mold is in the open state to form a stretched preform. The stretch rod is further operable to be withdrawn from the stretched preform, where the mold is operable to move from the open state to the closed state to truncate a portion of the stretched preform at the second end to form a truncated preform. The blow nozzle is operable to transfer the pressurized fluid into the truncated preform to urge the truncated preform to expand toward the internal surface of the mold cavity to thereby form the reduced material container.

The system can further include a pressure source configured to provide the pressurized fluid. Embodiments include where the pressurized fluid is a gas and where the pressurized fluid is a liquid. The pressure source can have an inlet, a chamber, an outlet, and a mechanically driven piston-like device moveable within the chamber in a first direction to draw the liquid into the chamber through the inlet and moveable in a second direction to urge the liquid out of the chamber through the outlet as the pressurized fluid.

Methods of making a reduced material container are provided that include holding a preform adjacent to an open end of the preform. The preform is stretched to form a stretched preform. A mold is closed about the stretched preform thereby truncating the stretched preform to form a truncated preform. A pressurized fluid is introduced into the truncated preform to expand the truncated preform toward an internal surface of the mold to form the reduced material container.

The present technology further provides reduced material containers made using the systems and methods provided herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
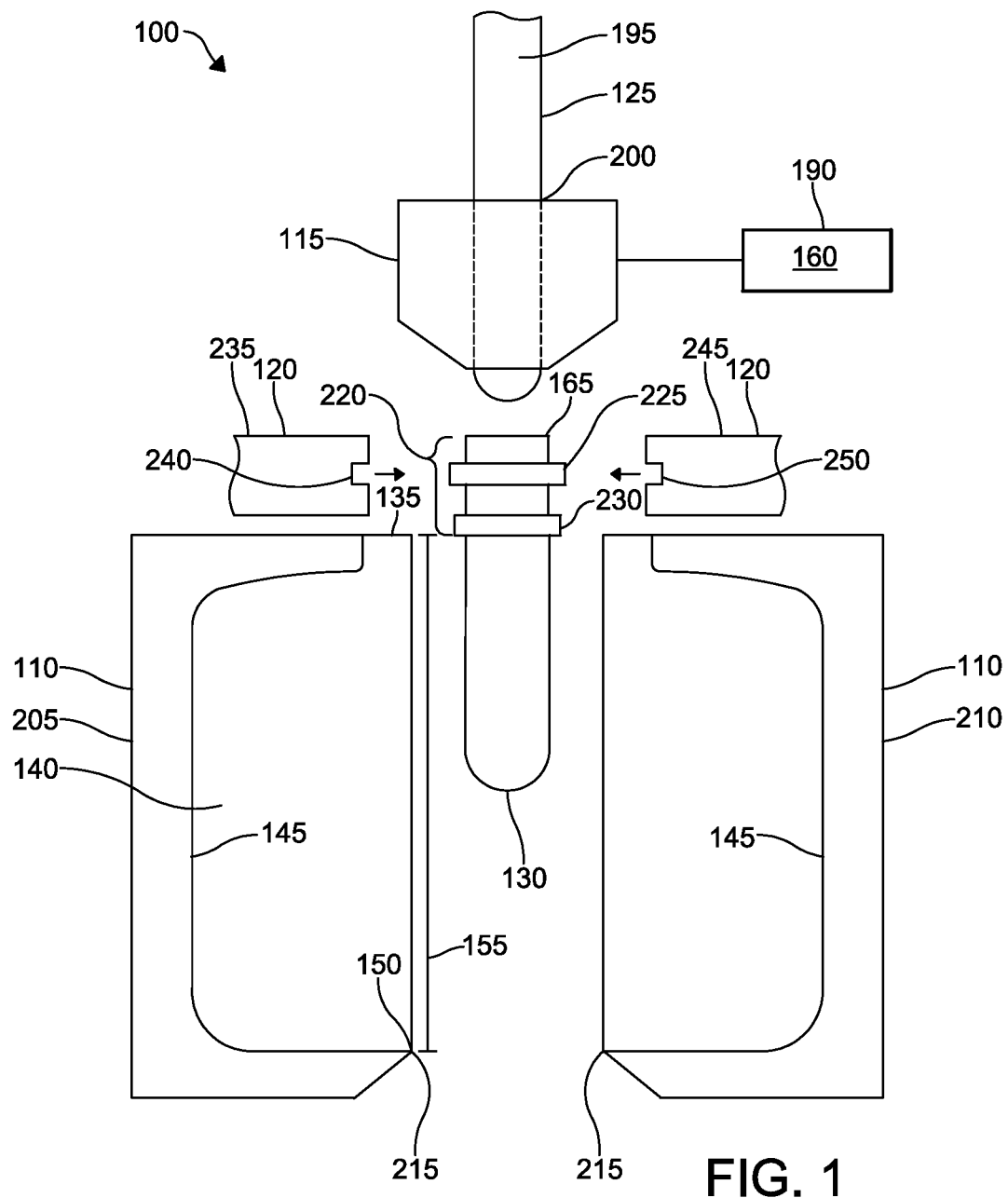
FIG. 1 is a schematic depiction of an embodiment of a system for making a reduced material container in operation, where a preform is held by a holder.
Figure 2:
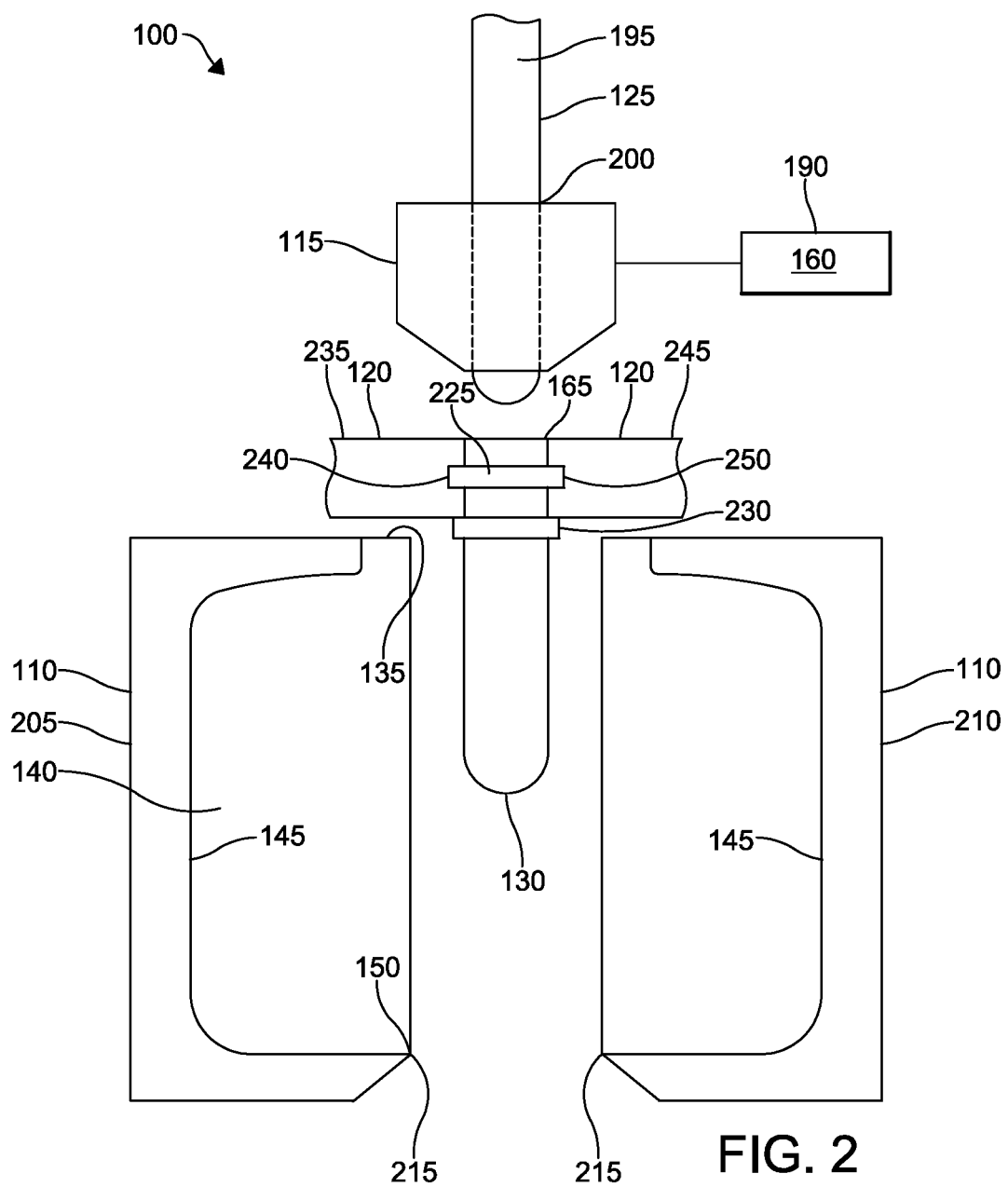
FIG. 2 is a schematic depiction of the system illustrated in FIG. 1, a stretch rod is extended into the preform to stretch the preform.
Figure 3:
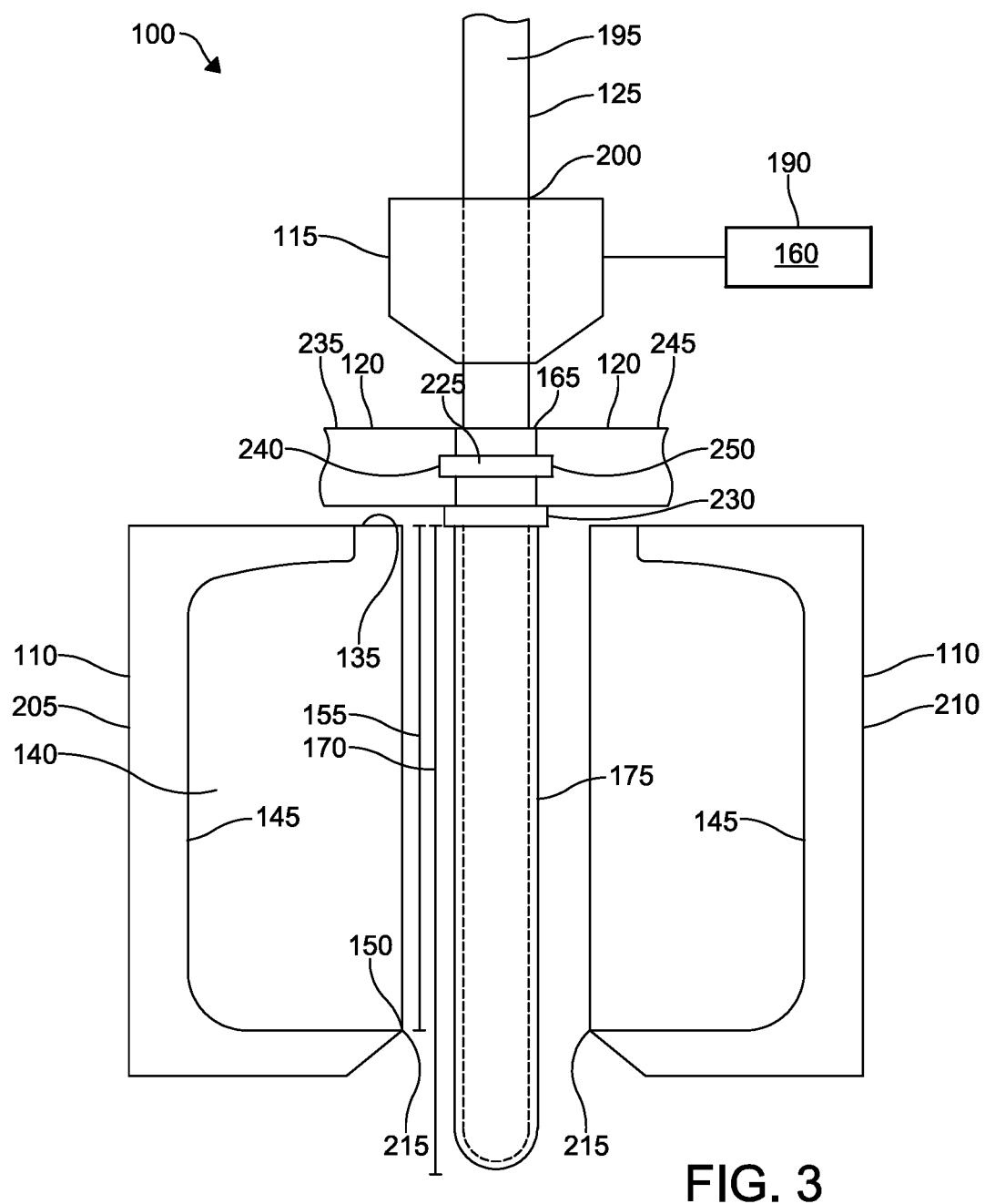
FIG. 3 is a schematic depiction of the system illustrated in FIG. 2, where the preform is stretched beyond the bottom of a mold cavity to form a stretched preform.

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

All documents, including patents, patent applications, and scientific literature cited in this detailed description are incorporated herein by reference, unless otherwise expressly indicated. Where any conflict or ambiguity can exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology provides ways to make reduced material containers, including stretch blow molded containers having a sidewall and a bottom that have substantially the same thickness. Systems for making a reduced material container include a mold configured to accept a preform at a first end thereof, the mold having an open state and a closed state, and the closed state forming a cavity defining an internal surface. The internal surface of the mold has a second end located remotely from the first end, where a first length is defined by a distance between the first end and the second end. A blow nozzle is configured to receive a pressurized fluid and dispense the pressurized fluid to the preform. A holder is configured to hold the preform adjacent to an open end of the preform. A stretch rod is configured to mechanically stretch the preform to a second length, where the second length is greater than the first length. In this way, the stretch rod is operable to stretch the preform to the second length when the mold is in the open state to form a stretched preform and the stretch is operable to be withdrawn from the stretched preform. The mold is operable to move from the open state to the closed state to truncate a portion of the stretched preform at the second end to form a truncated preform. The blow nozzle is operable to transfer the pressurized fluid into the truncated preform to urge the truncated preform to expand toward the internal surface of the mold cavity to thereby form a reduced material container.

Methods of making a reduced material container include holding a preform adjacent to an open end of the preform and stretching the preform to form a stretched preform. A mold is closed about the stretched preform thereby truncating the stretched preform to form a truncated preform. A pressurized fluid is introduced into the truncated preform to expand the truncated preform toward an internal surface of the mold to form the reduced material container. Various reduced material containers can be made using the systems and methods provided herein. In this way, it is possible to reduce a thickness of a bottom of a stretch blow molded container.

With reference to FIGS. 1-8, an embodiment of a system for making a reduced material container according to the present technology is shown and generally referred to as reference numeral 100. The series of figures show an embodiment of an operational sequence for making a reduced material container 105 using the system 100 in accordance with the present technology. As will be appreciated from the following description, the system 100 can have structure and features that vary from those depicted and can include additional structure and features than those depicted. Likewise, the associated operational sequence of the system 100 can combine various actions, where such actions can operate essentially simultaneously or can at least overlap in certain operational aspects, and certain actions shown operating in concert or at least overlapping in action can be initiated and completed separately and in a sequential fashion, without any overlap in operation.

Figure 5:
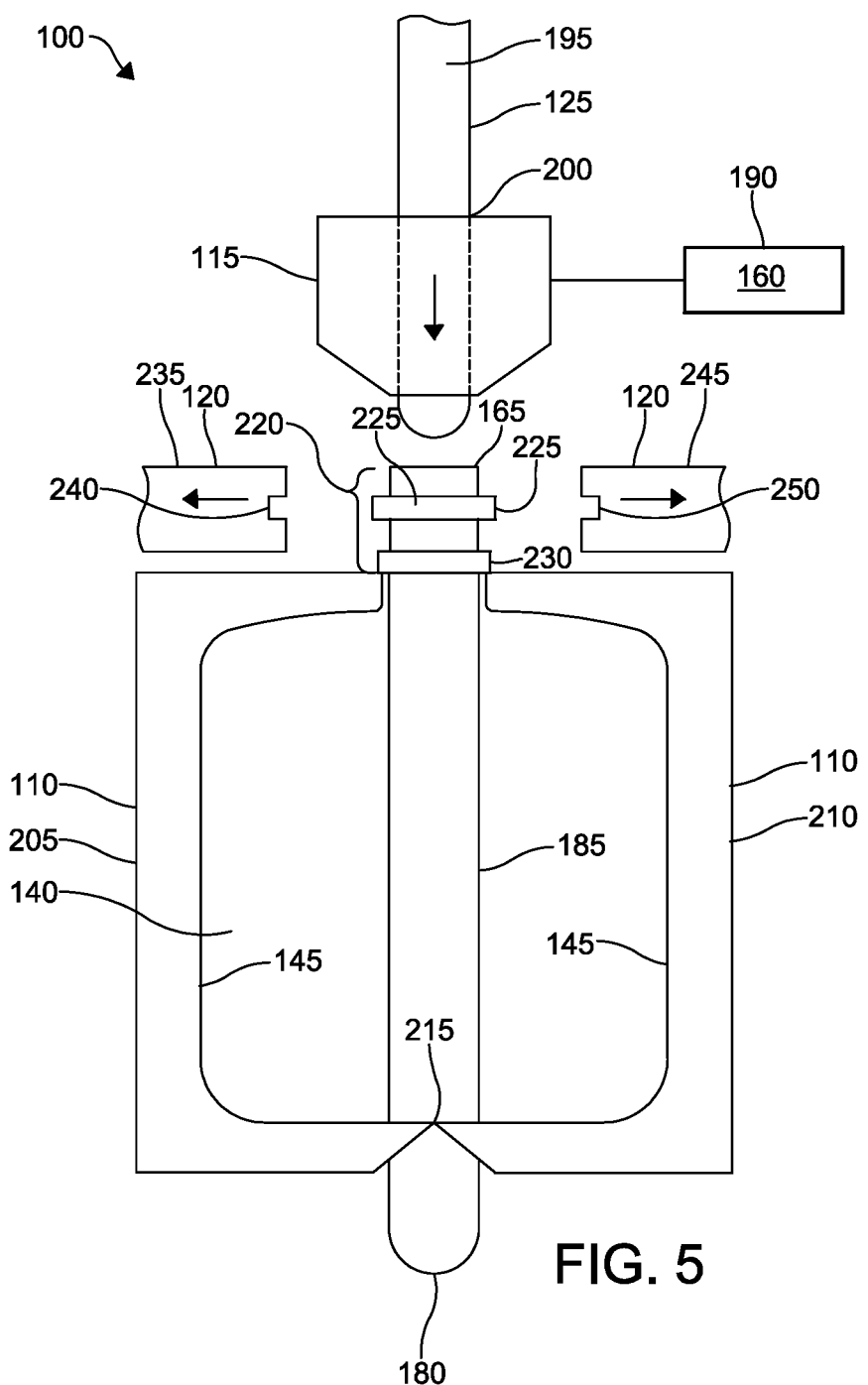
FIG. 5 is a schematic depiction of the system of FIG. 4, where the bottom of the stretched preform is truncated by the closed mold, the holder withdraws from the preform, and the blow nozzle engages the preform.
Figure 6:
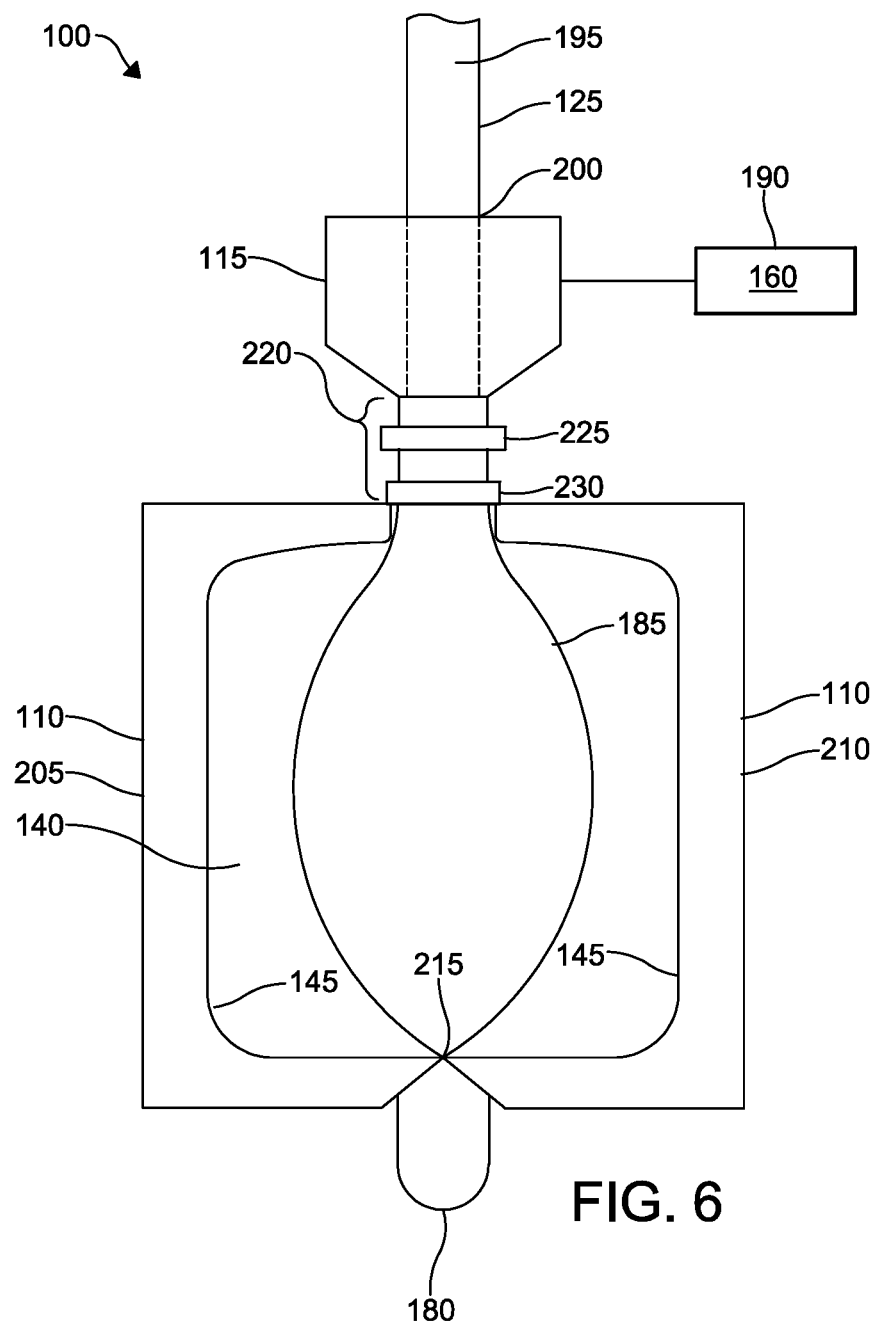
FIG. 6 is a schematic depiction of the system of FIG. 5, where a pressurized fluid is introduced into the truncated preform from the blow nozzle to expand the truncated preform.
Figure 7:
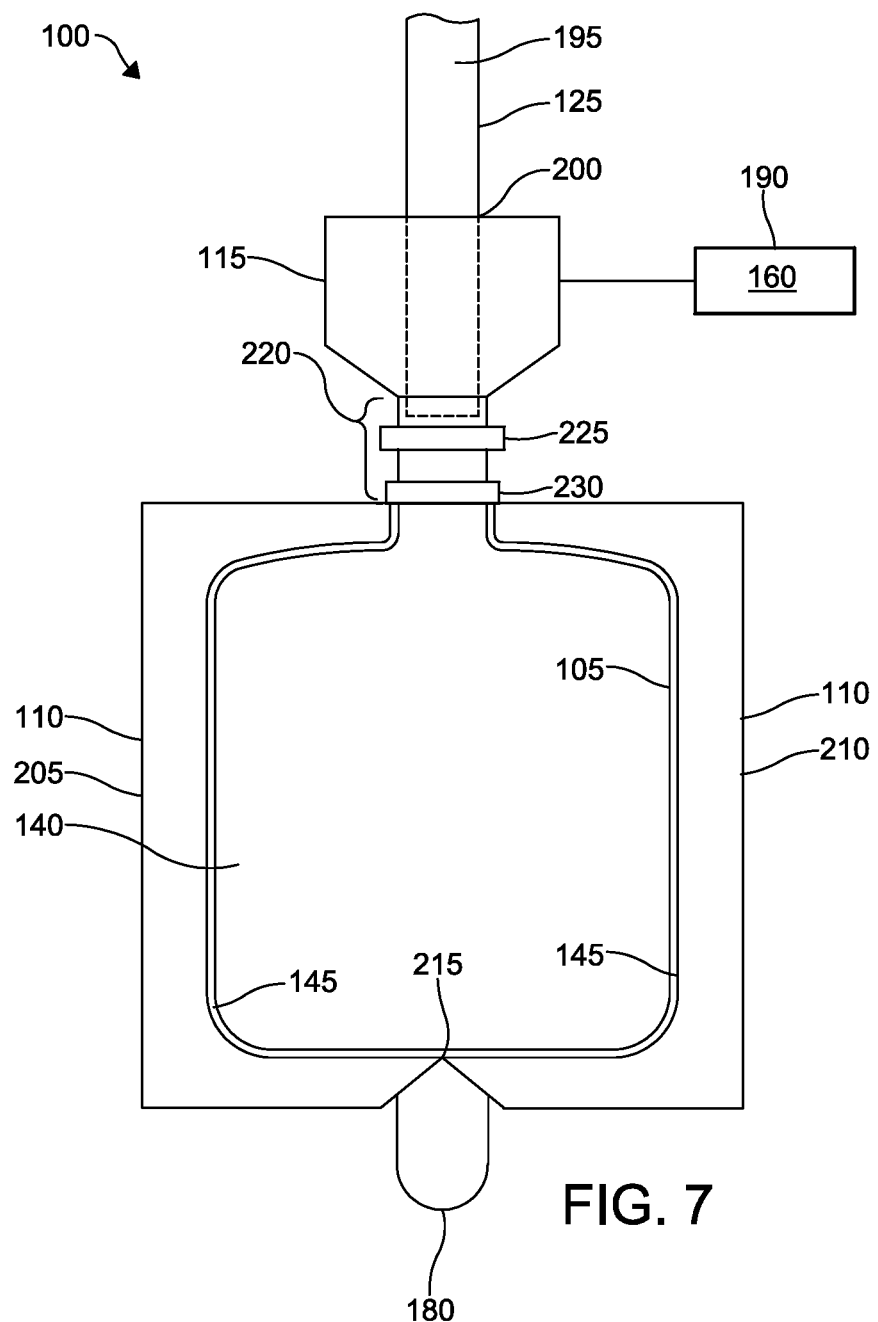
FIG. 7 is a schematic depiction of the system of FIG. 6, where the truncated preform is fully expanded to conform to the mold cavity.

The system 100 can include a mold 110, a blow nozzle 115, a holder 120, and a stretch rod 125. The mold 110 is configured to accept a preform 130 at a first end 135 thereof. The mold 110 has an open state, as shown in FIGS. 1-4 and 8, and a closed state, as shown in FIGS. 5-7. In the closed state, the mold 110 forms a cavity 140 defining an internal surface 145. The internal surface 145 has a second end 150 located remotely from the first end 135; for example, in the embodiment depicted, the second end 150 is substantially opposite the first end 135. A first length 155 is defined by a distance between the first end 135 and the second end 150. The blow nozzle 115 is configured to receive a pressurized fluid 160 and dispense the pressurized fluid 160 to the preform 130. The holder 120 is configured to hold the preform 130 adjacent to an open end 165 of the preform 130. The stretch rod 125 is configured to mechanically stretch the preform 130 to a second length 170, where the second length 170 is greater than the first length 155; see FIG. 3.

The system 100 includes the following operational capabilities. The stretch rod 125 is operable to stretch the preform 130 to the second length 170 when the mold 110 is in the open state to form a stretched preform 175. The stretch rod 125 is further operable to then be withdrawn from the stretched preform 175. The mold 110 is operable to move from the open state to the closed state to truncate a portion 180 of the stretched preform 175 at the second end 150 to form a truncated preform 185; see FIG. 5. The blow nozzle 115 is operable to transfer the pressurized fluid 160 into the truncated preform 185 to urge the truncated preform 185 to expand toward the internal surface 145 of the mold cavity 140 to thereby form the reduced material container 105; see FIGS. 7-8.

The system 100 can also include a pressure source 190 that is configured to provide the pressurized fluid 160 to the blow nozzle 115. In some embodiments the pressurized fluid 160 is a gas and in other embodiments the pressurized fluid 160 is a liquid. The pressure source 190 can also have an inlet, a chamber, an outlet, and a mechanically driven piston-like device moveable within the chamber in a first direction to draw the liquid into the chamber through the inlet and moveable in a second direction to urge the liquid out of the chamber through the outlet as the pressurized fluid, as described for U.S. Pat. Nos. 8,435,026 and 8,858,214 both to Andison et al. The piston-like device of the pressure source 190 can be one of a piston, a pump, and an accumulator, again as described for U.S. Pat. Nos. 8,435,026 and 8,858,214 both to Andison et al.

Various additional structural and functional aspects can be incorporated into the system 100. The stretch rod 125 can be vented through a passage 195 defined therein. In this way, introduction of the pressurized fluid 160 through the blow nozzle 115 into the truncated preform 185 can be accompanied by evacuation of air or gas from within the truncated preform 185 through the passage 195 of the stretch rod 125. The blow nozzle 115 can define an opening 200 for slidably accepting the stretch rod 125 to mechanically stretch the preform 130. The mold 110 can be formed of multiple parts, where in the embodiment shown, the mold 110 includes a first part 205 and a second part 210. The mold 110 can further include a truncating means 215 at or near the second end 150 that is configured to truncate the stretched preform 175 into the truncated preform 185. The truncating means 215, for example, can include a cutting means, such as one or more blades or sharp edges, where the cutting means can optionally include a heating means to facilitate truncation and sealing of the stretched preform 175 into the truncated preform 185. It should be noted that a pinching effect of the truncating means 215 can serve to seal the truncated preform 185 and/or the subsequent expansion of the truncated preform 185 into the reduced material container 105 can improve sealing thereof due to plasticity of the material used in the preform 130.

As depicted, the embodiment of the holder 120 in the figures is configured to hold the preform 130 adjacent to the open end 165 of the preform, where the preform 130 can include a finish 220 at or near the open end 165 thereof. The finish 220 can include various features to facilitate with sealing the resultant reduced material container 105, including various features to cooperate with capping or providing a closure on the reduced material container 105, such as threading, one or more grooves, protrusions, annular recesses, etc. The finish 220 can also include one or more support rings, where the embodiment shown includes a first support ring 225 and a second support ring 230. The holder 120 includes an engagement means to engage the preform 130 adjacent to the open end 165 thereof. The engagement means can be configured as a first arm 235 having a first recess 240 and a second arm 245 having a second recess 250, where the first and second arms 235, 245 move to engage the preform 130 by receiving the first support ring 225 within the first and second recesses 240, 250. It should be noted that the holder 120 can also be configured and/or operated to engage the second support ring 230 or can be configured to operate with a preform that only includes a single support ring. In the embodiment shown, the second support ring 230 can rest upon or be held or captured by the first end 135 of the mold 110. In this way, the holder 120 contacts at least a portion of the finish 220 of the preform 130 when holding the preform 130 adjacent to the open end 165 of the preform 130.

Embodiments of the system 100 can include positioning the holder 120 in various ways. Certain embodiments include where the holder 120 is coupled to the mold 110. For example, the holder 120 can be part of the mold 110, where the first and second arms 235, 245 can move with and independently from the first and second parts 205, 210 of the mold 110. It should be noted that the holder 120 and/or the first end 135 of the mold 110 can be configured to cooperate with various preforms 130 and finishes 220; for example, the holder 120 can be exchanged with other holders 120 to complement various finishes 220 of various preforms 130. The holder 120 can also be formed as integral portion of the mold 120. In this way, the holder 120 is not designed to be separated from the mold 120, where each essentially forms a unit structure that is particular to accepting a particular preform 130 and forming a particular a reduced material container 105. Other embodiments include where the holder 120 is coupled to the blow nozzle 115. In this way, the holder 120 can function with the blow nozzle 115 to hold a particular preform 130, but various shaped molds 110 can be used to form various reduced material containers 105 from the particular preform 130. Thus, it can be possible to have the holder 120 form an integral portion of the blow nozzle 115, where the combination thereof forms a unit structure for accepting and blowing a particular preform 130.

Methods of operating a system 100 for making a reduced material container 105 can include the following steps and actions. It should be noted that FIGS. 1-8 illustrate one particular operational sequence of an embodiment of a system 100 in accordance with the present technology. The embodiment shown in the figures can be modified in whole or in part to provide other embodiments of the present technology, which can combine or separate various actions, where such actions can operate essentially simultaneously or can at least overlap in certain operational aspects, such that certain actions shown operating in concert or at least overlapping in action can also be initiated and completed separately and in a sequential fashion, without any overlap in operation. Likewise, it is possible to combine or at least overlap or initiate actions depicted separately where there are no physical or structural barriers to doing so, as would be understood by one skilled in the art.

Figure 4:
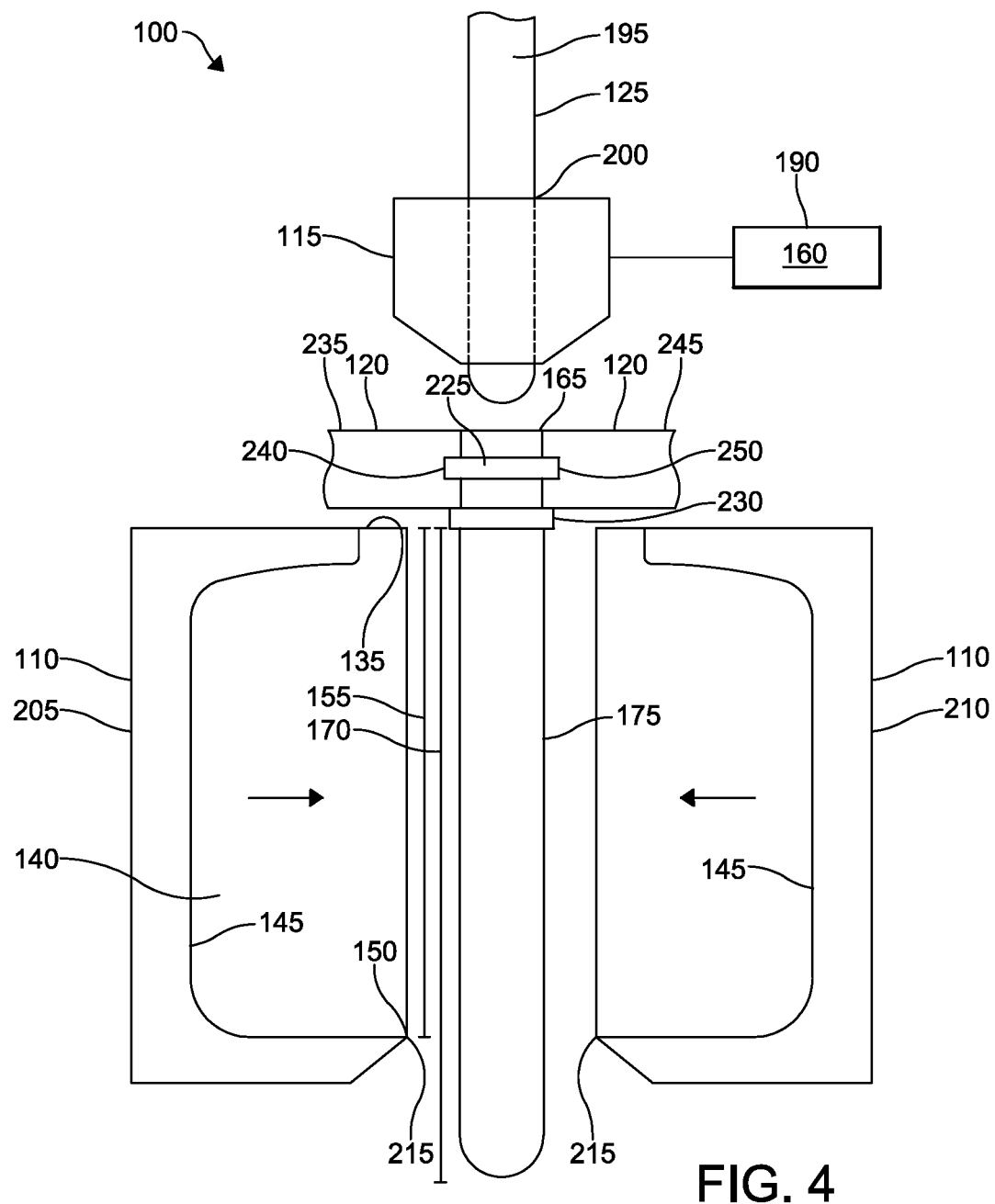
FIG. 4 is a schematic depiction of the system of FIG. 3, where the stretch rod is withdrawn from the stretched preform and the mold is starting to close about the stretched preform.

With reference to FIGS. 1-4, a preform 130 is held and stretched to form a stretched preform 175. At the outset, the embodiment of the system 100 for making a reduced material container 105 is shown where the preform 130 is held by the holder 120; see FIGS. 1-2. The particular embodiment depicted has the holder 120 holding the preform 130 adjacent to the open end 165 of the preform 130 where the holder 120 contacts at least a portion of the finish 220 of the preform 130. The preform 130 is then stretched to form the stretched preform 175 by inserting the stretch rod 125 into the preform 130 and mechanically stretching the preform 130. The stretch rod 125 is shown starting to extend into the preform 130 in FIG. 2 and is shown extended in FIG. 3. In particular, the preform 130 is stretched beyond the bottom of the mold cavity 145 (e.g., beyond the second end 150 of the internal surface 145 of the mold cavity 145) to form the stretched preform 175. FIG. 4 shows the stretch rod 125 withdrawn from the stretched preform 175 and the mold 110 starting to close about the stretched preform 175.

The mold 110 therefore accepts the preform 130 at the first end 135 of the mold 110. The mold 110 shown has the first part 205 and the second part 210 moving between an open state and a closed state, with the closed state forming the cavity 140 defining the internal surface 145 of the mold 110. The internal surface 145 has the second end 150 located remotely from (e.g., substantially opposite) the first end 135, where the first length 155 is defined by the distance between the first end 135 and the second end 150. As can be seen, the stretch rod 125 mechanically stretches the preform 130 to the second length 170 (e.g., beyond the bottom of the mold in the embodiment shown), where the second length 170 is greater than the first length 155.

Turning now to FIG. 5, a portion of the stretched preform 175 (e.g., the bottom of the stretched preform 175) is truncated by closing of the mold 110, the holder 120 withdraws from holding the truncated preform 185, and the blow nozzle 115 engages the truncated preform 185. As depicted, closing the mold 110 about the stretched preform 175 thereby truncates the stretched preform 175 to form the truncated preform 185, which can be effected by the truncating means 215 located at or near the second end 150 in the embodiment shown. The truncating means 215, as detailed herein, can include a cutting means, such as one or more blades or sharp edges, where the cutting means can optionally include a heating means to facilitate truncation and sealing of the stretched preform 175 into the truncated preform 185. It is again noted that a pinching effect of the truncating means 215 can serve to seal the truncated preform 185 and/or the subsequent expansion of the truncated preform 185 into the reduced material container 105 can improve sealing thereof due to plasticity of the material used in the preform 130.

With reference to FIGS. 6-7, a pressurized fluid 160 is introduced into the truncated preform 185 from the blow nozzle 115, expanding the truncated preform 185 toward the internal surface 145 of the mold cavity 140, conforming the truncated preform 185 thereto, and forming the reduced material container 105. The pressurized fluid 160 can be supplied to the blow nozzle 115 by various types of pressure sources 190. For example, the pressure source 190 can provide a gas or a liquid as the pressurized fluid 160. In certain embodiments, the pressure source 190 can be a high pressure container or reservoir of pressurized fluid 160. In other embodiments, the pressurized fluid 160 can be provided by a pressure source 190 having an inlet, a chamber, an outlet, and a mechanically driven piston-like device moveable within the chamber in a first direction to draw the liquid into the chamber through the inlet and moveable in a second direction to urge the liquid out of the chamber through the outlet as the pressurized fluid, as described for U.S. Pat. Nos. 8,435,026 and 8,858,214 both to Andison et al. The piston-like device of the pressure source 190 can be one of a piston, a pump, and an accumulator, again as described for U.S. Pat. Nos. 8,435,026 and 8,858,214 both to Andison et al.

It should be noted that while FIGS. 5-7 show the portion 180 truncated from the stretched preform 175 by the truncating means 215 remaining at or near the second end 150 and truncating means 215 of the mold 110, the truncated portion 180 of the stretched preform 175 can be actively removed therefrom and/or can passively drop away by gravity, for example. The truncated portion 180 can hence be recovered and recycled immediately after the stretched preform 175 is truncated by closing of the mold 110 (e.g., FIG. 5), or can be recovered and recycled at various points thereafter (e.g., FIGS. 6-8). The truncated portion 180 can be recycled to form new preforms or other products, for example.

Figure 8:
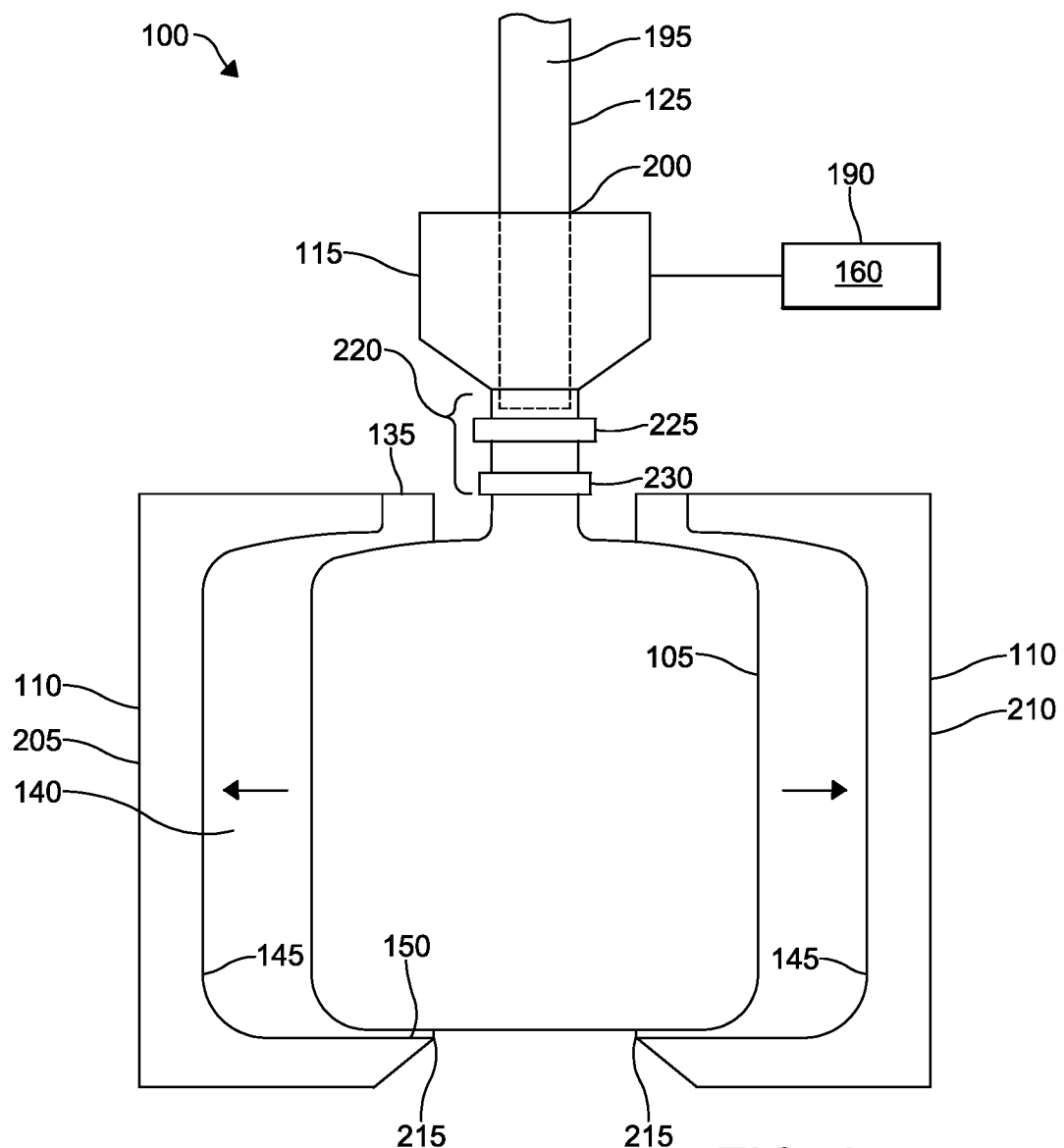
FIG. 8 is a schematic depiction of the system of FIG. 7, where the mold is opened to release a finished container having a substantially uniform wall and bottom thickness, where the pinched off bottom portion of the former truncated preform is recycled.

Turning now to FIG. 8, the mold 110 is opened to release a finished reduced material container 105 having a substantially uniform wall and bottom thickness, where the truncated or pinched off bottom portion 180 of the former truncated preform 185 is recycled. The first part 205 and a second part 210 of the mold 110 separate from the container 105 and the blow nozzle 115 can be disengaged from the open end 165. In this way, the resultant container 105 can be removed and the system 100 loaded with another preform 130 to repeat the process.

The following benefits and advantages can be realized by the present technology. Containers can be formed from less material and the containers can have uniform wall and bottom thickness compared to containers formed by other stretch blow molding techniques. For example, other stretch blow molding techniques can employ a stretch rod to stretch a preform within a mold. However, the stretch rod typically contacts the interior bottom of the preform and extends to primarily stretch the walls of the preform to a length within a mold. The walls of the preform can be stretched along a longitudinal axis by extension of the stretch rod to provide a relatively uniform wall thickness, but the bottom of the preform contacting a distal end of the stretch rod is not subjected to the same stretching forces. As a result, the bottom of the resulting blown container is typically thicker than the walls, where in certain cases the bottom can be substantially thicker; e.g., twice as thick. The present technology, in contrast, over-stretches the preform beyond the mold, where the bottom of the preform contacted by the stretch rod is subsequently truncated or pinched off from a remainder of the stretched preform. Accordingly, only stretched sidewall of the stretched preform is contained within the mold, where the stretched sidewall of the stretched preform has a substantially uniform thickness that is less than the thickness of the bottom of the preform contacted by the stretch rod. The stretched sidewall is therefore turned into the base of the container. The reduced material container resulting from the present technology can provide significant savings with respect to material investment, savings with respect to weight, and can simplify recycling by retaining a portion of the preform onsite (e.g., the truncated bottom portion) that would have been otherwise transported offsite. Reducing unnecessary material in the bottom of resultant containers can accordingly maximize the amount of product within a container relative to the weight of the product combined with the container. Transport energy and shipping costs are therefore minimized.

The present technology can utilize preforms comprising various plastic materials to form various containers. Suitable materials include one or more polymers such as polyethylene terephthalate, various polyolefin materials, such as high and low density polyethylenes, polypropylenes, polyesters, polycarbonate, as well as a number of other plastics can be processed using the present technology.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A system for making a reduced material container comprising:
   a mold configured to accept a preform at a first end thereof, the mold having an open state and a closed state, the closed state forming a cavity defining an internal surface, the internal surface having a second end located remotely from the first end, where a first length is defined by a distance between the first end and the second end;
   a blow nozzle configured to receive a pressurized fluid and dispense the pressurized fluid to the preform; and
   a stretch rod configured to mechanically stretch the preform to a second length, the second length being greater than the first length;
   wherein the stretch rod is operable to stretch the preform to the second length when the mold is in the open state to form a stretched preform, wherein the stretch rod is vented, the stretch rod being further operable to be withdrawn from the stretched preform, the mold operable to move from the open state to the closed state to truncate a portion of the stretched preform at the second end to form a truncated preform, the blow nozzle operable to transfer the pressurized fluid into the truncated preform to urge the truncated preform to expand toward the internal surface of the mold cavity to thereby form the reduced material container.

2. The system of claim 1, further comprising a pressure source configured to provide the pressurized fluid.

3. The system of claim 2, wherein the pressurized fluid is a gas.

4. The system of claim 2, wherein the pressurized fluid is a liquid.

5. The system of claim 4, wherein the pressure source has an inlet, a chamber, an outlet, and a mechanically driven piston-like device moveable within the chamber in a first direction to draw the liquid into the chamber through the inlet and moveable in a second direction to urge the liquid out of the chamber through the outlet as the pressurized fluid.

6. The system of claim 5, wherein the piston-like device is one of a piston, a pump, and an accumulator.

7. The system of claim 1, further comprising a holder configured to hold the preform adjacent to an open end of the preform and contact at least a portion of a finish of the preform.

8. The system of claim 7, wherein the holder is coupled to the mold.

9. The system of claim 7, wherein the holder is an integral portion of the mold.

10. The system of claim 7, wherein the holder is coupled to the blow nozzle.

11. The system of claim 7, wherein the holder is an integral portion of the blow nozzle.

12. A method of making a reduced material container comprising:
holding a preform adjacent to an open end of the preform;
stretching the preform to form a stretched preform, wherein stretching the preform to form the stretched preform includes inserting a stretch rod into the preform and mechanically stretching the preform;
closing a mold about the stretched preform thereby truncating the stretched preform to form a truncated preform; and
introducing a pressurized fluid into the truncated preform to expand the truncated preform toward an internal surface of the mold to form the reduced material container, wherein during the introducing of the pressurized fluid into the truncated preform a gas disposed within the truncated preform is vented through a passage of the stretch rod.

13. The method of claim 12, wherein holding the preform adjacent to the open end of the preform includes using a holder to contact at least a portion of a finish of the preform.

14. The method of claim 13, wherein the mold is configured to accept the preform at a first end thereof, the mold having an open state and a closed state, the closed state forming a cavity defining the internal surface, the internal surface having a second end located remotely from the first end, where a first length is defined by a distance between the first end and the second end, the stretch rod mechanically stretching the preform to a second length, the second length being greater than the first length.

15. The method of claim 12, wherein the pressurized fluid is a gas.

16. The method of claim 12, wherein the pressurized fluid is a liquid.

17. The method of claim 16, wherein the pressurized fluid is provided by a pressure source, the pressure source having an inlet, a chamber, an outlet, and a mechanically driven piston-like device moveable within the chamber in a first direction to draw the liquid into the chamber through the inlet and moveable in a second direction to urge the liquid out of the chamber through the outlet as the pressurized fluid.

18. A system for making a reduced material container comprising:
a mold configured to accept a preform at a first end thereof, the mold having an open state and a closed state, the closed state forming a cavity defining an internal surface, the internal surface having a second end located remotely from the first end, where a first length is defined by a distance between the first end and the second end;
a holder configured to hold the preform adjacent to an open end of the preform and contact at least a portion of a finish of the preform, wherein the holder is an integral portion of the mold;
a blow nozzle configured to receive a pressurized fluid and dispense the pressurized fluid to the preform; and
a stretch rod configured to mechanically stretch the preform to a second length, the second length being greater than the first length;
wherein the stretch rod is operable to stretch the preform to the second length when the mold is in the open state to form a stretched preform, the stretch rod being further operable to be withdrawn from the stretched preform, the mold operable to move from the open state to the closed state to truncate a portion of the stretched preform at the second end to form a truncated preform, the blow nozzle operable to transfer the pressurized fluid into the truncated preform to urge the truncated preform to expand toward the internal surface of the mold cavity to thereby form the reduced material container.

* * * * *